United States Patent [19]

Trusov et al.

[11] Patent Number: 5,364,586
[45] Date of Patent: Nov. 15, 1994

[54] PROCESS FOR THE PRODUCTION OF POROUS MEMBRANES

[75] Inventors: Lev I. Trusov; Vladimir N. Lapovok; Victor I. Novikov, all of Moscow,

[73] Assignee: Ultram International L.L.C., Denver, Colo.

[21] Appl. No.: 107,515

[22] Filed: Aug. 17, 1993

[51] Int. Cl.$^5$ .............................................. B22F 3/12
[52] U.S. Cl. ............................................ 419/2; 419/5; 419/6; 419/10; 419/12; 419/13; 419/14; 419/19; 419/23; 419/43; 419/39; 419/57; 210/500.25
[58] Field of Search .................. 419/2, 5, 6, 10, 12, 419/13, 14, 19, 23, 39, 43, 57; 210/500.25

[56] References Cited

U.S. PATENT DOCUMENTS

| | | | |
|---|---|---|---|
| 2,241,095 | 5/1941 | Marvin | 29/189 |
| 2,251,410 | 8/1941 | Koehring et al. | 29/189 |
| 2,267,918 | 3/1941 | Hildabolt | 29/189 |
| 3,022,187 | 2/1962 | Eyraud et al. | 117/16 |
| 3,773,549 | 11/1973 | Elbert et al. | 117/129 |
| 4,060,488 | 11/1977 | Hoover et al. | 210/433 M |
| 4,208,454 | 6/1980 | Reed et al. | 427/238 |
| 4,613,369 | 9/1986 | Koehler | 75/246 |
| 4,738,874 | 4/1988 | Berardo et al. | 427/244 |
| 4,762,619 | 8/1988 | Gaddis et al. | 210/639 |
| 4,888,114 | 12/1989 | Gaddis et al. | 210/500.25 |
| 4,935,139 | 6/1990 | Davidson et al. | 210/490 |
| 4,935,199 | 6/1990 | Nishio et al. | 419/36 |

FOREIGN PATENT DOCUMENTS 1173308  8/1984  Canada ........................ 117/88.5

*Primary Examiner*—Donald P. Walsh
*Assistant Examiner*—John N. Greaves
*Attorney, Agent, or Firm*—Sheridan, Ross & McIntosh

[57] ABSTRACT

A filter membrane and a process for making the filter membrane are provided. The filter membrane comprises a metal substrate having a filtering layer thereon comprising sintered ultra-fine particles of metal or ceramic compounds. The filtering layer preferably has an average pore size of from about 30 nanometers to about 200 nanometers. The filter membranes can withstand pressure drops of up to about 0.6 MPa and are useful for a variety of filtering applications.

39 Claims, No Drawings

PROCESS FOR THE PRODUCTION OF POROUS MEMBRANES

FIELD OF THE INVENTION

The present invention relates to a process for the production of porous membranes for filtering applications, particularly membranes having a porous metallic substrate with metallic or inorganic particles dispersed thereon to form a filtering layer.

BACKGROUND OF THE INVENTION

Porous membranes, or filters, have been developed for use in a wide variety of applications. For example, membranes can be used to separate isotopes, to filter liquids, to purify gas streams and for other separation processes.

Different types of porous membranes are described in the prior art. Membranes can have a variety of shapes and have been fabricated from different materials. For example, Canadian Pat. No. 1173308 by Clement et al. discloses a process for making a tubular microporous filter element. The process includes forming a layer of fine particles on a porous tubular substrate and applying hydrostatic pressure to decrease the pore radii. It is disclosed that the filter element is useful for separating isotopes or very fine particles.

U.S. Pat. No. 4,738,874 by Berardo et al. discloses a method for producing mineral membranes. Particles selected from mineral compounds such as simple or mixed metal oxides are dispersed on a substrate, such as an alumina substrate, from a liquid suspension. The composite membrane is then annealed at an elevated temperature to form a rigid membrane.

For many applications, a rigid and inflexible membrane is undesirable. It has therefore been proposed to form membranes having a ductile metallic substrate. For example, U.S. Pat. No. 4,888,114 by Gaddis et al. discloses a process for forming a filter having a metallic base. Metal oxide particles (e.g. $TiO_2$) having a size of from 0.2 to 1.0 micrometer are drawn into a porous metal substrate (e.g. stainless steel) having a pore size of from about 0.5 micrometers to about 10 micrometers and excess metal oxide particles are then removed from the surface of the substrate. The metal oxide particles within the metal substrate are then sintered to form a filter element.

U.S. Pat. No. 4,935,139 by Davidson et al. discloses a process for fabricating a composite membrane. A metallic support having an average pore size of from 1 to 10 micrometers is covered with a porous film of sintered non-metallic particles having two average particle size distributions, one having particles from 0.5 $\mu$m to 50 $\mu$m and the other having particles from 4 nm to 1 $\mu$m. The smaller particles act as a sintering aid. Sintering of the composite places the film in biaxial compression due to thermal expansion mismatch of the film and the metallic substrate.

U.S. Pat. No. 4,613,369 by Koehler discloses a method for making a porous metal filter. A stabilized suspension of dispersed metal particles is applied to a porous metal support, such as a wire mesh screen, to infiltrate the openings in the porous metal support. Excess particles are removed from the surface of the support with a doctor blade. The support is then heated to dry the stabilized suspension of metal particles and is compressed between rollers to decrease the pore size and improve the sintering characteristics. The support is then sintered to fuse the individual particles of the metal particulates to the metal support and to each other. The metal particulates have a particle size in the range from about 1 $\mu$m to about 200 $\mu$m.

SUMMARY OF THE INVENTION

The present invention is directed to a process for the fabrication of a composite membrane. The process can include the steps of dispersing metallic particles having a particle size of less than about 50 $\mu$m on a porous metallic substrate to form a sublayer, pre-sintering the sublayer to adhere the sublayer to the metallic substrate, covering at least a portion of the sublayer with ultra-fine ceramic particles having an average particle size of less than about 500 nm, applying shear force to the ultra-fine particles to plastically deform the particles and sintering the ultra-fine particles to form a composite membrane comprising a filtering layer and a metallic substrate.

In a preferred embodiment, the metallic particles are dispersed on the metallic substrate such that substantially no metallic particles are in contact with adjacent metallic particles. In yet another embodiment, the step of applying shear force includes the step of passing the ultra-fine particles on the metallic substrate through a roller mill. The roller mill can apply a pressure of from about 50 MPa to about 100 MPa.

The metallic particles can have an average particle size of from about 5 $\mu$m to about 20 $\mu$m. In one embodiment, the metallic particles consist essentially of the same metallic material as the metallic substrate. In a most preferred embodiment, the ultra-fine ceramic particles are mixed with ultra-fine metallic particles to improve inter-particle sliding during the step of applying shear force.

In yet another embodiment of the present invention, a process for the fabrication of a composite membrane includes the steps of dispersing ultra-fine particles on a metallic substrate, applying shear force to the ultra-fine particles to plastically deform the particles and sintering the ultra-fine particles to form a composite membrane. Preferably, the ultra-fine particles have an average particle size of less than about 200 nm. In one embodiment, the ultra-fine particles consist essentially of metal particles and preferably are formed from the same metal as the metallic substrate. The ultra-fine particles can also comprise ceramic particles, preferably having an average size of less than about 200 nm.

The present invention is also directed to a process for the fabrication of a composite membrane, including the steps of providing a porous metallic substrate having thickness of less than about 250 $\mu$m an average pore size of less than about 30 $\mu$m and a total porosity of from about 30 percent to about 45 percent, dispersing metallic particles having an average particle size of less than about 50 $\mu$m on the metallic substrate to form a sublayer on the metallic substrate wherein substantially no metallic particles are in contact with adjacent metallic particles, pre-sintering the substrate having the sublayer dispersed thereon at a temperature of from about 0.5 to about 0.7 of the melting temperature of the metallic substrate, covering at least a portion of the metallic substrate having the sublayer thereon with ultra-fine ceramic particles having an average particle size of less than about 200 nm, applying shear force to the ultra-fine particles on the substrate by passing the substrate through a rolling mill to plastically deform the particles and sintering the ultra-fine particles to form a composite membrane.

In addition, the present invention also provides a filter element comprising a top layer comprising sintered ultra-fine ceramic particles and having an average pore size of from about 30 nanometers to about 200 nanometers, a middle layer comprising sintered metallic particles having an average particle size of from about 5 $\mu$m to about 20 $\mu$m and a bottom layer comprising a porous metallic substrate, wherein the middle layer has a higher total porosity than the top layer and the bottom layer such that thermal stresses between the top layer and the bottom layer are reduced.

The filter element preferably has a thickness of less than about 250 $\mu$m and has sufficient strength to withstand a pressure drop of up to about 0.6 MPa without substantially degrading.

DESCRIPTION OF THE INVENTION

According to the present invention, a composite membrane filter is formed from a porous metal substrate and a filtering layer of ultra-fine particles adhered to the surface of the metal substrate. The filtering layer can include ultra-fine particles of metals or inorganic compounds such as ceramics. As used herein, the term ultra-fine particles refers to particles having an average size of less than about 500 nm. Further, the use of the term particle size herein refers to the diameter of the particles, unless otherwise indicated.

The porous metal substrate useful in practicing the present invention can be formed from virtually any metallic material and is preferably formed from a metal selected from titanium, iron, nickel, silver or alloys thereof. In one preferred embodiment, the metal substrate is made from stainless steel, such as austenitic stainless steel. A high corrosion resistance is desirable for the employment of membranes in many applications and the preferred metals can advantageously provide good corrosion resistance, particularly in corrosive gaseous and liquid mediums. However, other metallic materials may be useful, depending on the ultimate application of the membrane.

In a preferred embodiment, the metal substrate is in the form of a foil having a thickness of less than about 250 $\mu$m, more preferably having a thickness of less than about 200 $\mu$m. The average pore size of the pores in the metal substrate is preferably less than about 30 $\mu$m and more preferably is from about 2 $\mu$m to about 15 $\mu$m. As used herein, unless otherwise specified, the term pore size refers to the pore diameter. Preferably, the total porosity of the metal substrate is from about 30 percent to about 45 percent. As is known to those skilled in the art, such a porous metal substrate can be fabricated, for example, by pressing and sintering metal powder.

In accordance with the present invention, a thin filtering layer comprised of ultra-fine particles of an inorganic ceramic compound or of a metallic material is formed on the metal substrate. Suitable ceramic compounds can be chosen from among oxides, nitrides, carbides, borides, their solid solutions and mixtures thereof. Suitable metals compounds can include nickel, silver, copper, titanium, iron, or their alloys. A particular material can be selected to ensure sufficient corrosion resistance for a given application combined with good adhesion to the metal substrate. Preferred ceramic compounds include titania ($TiO_2$) and titanium nitride (TIN) since these materials have good corrosion resistance in different environments. $TiO_2$ is also compatible with many food products.

The average particle size of the ultra-fine particles used to form the filtering layer can be up to about 500 nm, but it is preferred that the average particle size not exceed about 200 nm. Most preferably, the average particle size is from about 10 nm to about 100 nm. Particles having a size greater than about 500 nm are generally not capable of plastically deforming under shear stress during the rolling step discussed hereinbelow.

In a preferred embodiment according to the present invention, the ultra-fine particle layer is formed in two discrete steps. The first step of the process comprises applying a very disperse layer of particles (hereinafter referred to as a sublayer) to the metal substrate and the second step comprises the application of ultra-fine ceramic particles to the substrate surface comprising the sublayer to form the filtering layer. When the filtering layer comprises ultra-fine metal particles, the first step of forming a sublayer is not necessary.

According to this preferred embodiment, the sublayer of particles is applied directly to the metal substrate. The particles which are used to form the sublayer are metal particles that are similar to the metal of the substrate and more preferably the particles are made from the same metal used for the substrate. Preferably, the particles used to form the sublayer have an average particle size of less than about 50 $\mu$m and more preferably have an average particle size of from about 5 $\mu$m to about 20 $\mu$m. The sublayer is applied to the metal substrate such that substantially all of the particles on the surface of the substrate are isolated from adjacent particles. That is, the sublayer particles are very disperse and the concentration of particles is low enough to ensure that very few, if any, of the particles are in physical contact with adjacent particles.

The particles that form the sublayer can be applied to the metal substrate by known methods such as dipping, casting, sputtering or settling in an electrostatic field. In the dipping process, the porous metal tape is passed horizontally through a liquid-particle suspension. Thin layers of particles are thus formed on the substrate surfaces. The particles on the lower surface of the substrate are removed from the substrate leaving a thin upper layer of fine particles. In a sputtering process, a particle suspension is sputtered using a nozzle and drops of the suspension are deposited on the substrate surface.

In a preferred embodiment of the present invention, a process known as forced vacuum bleeding is used to apply the particles to the substrate. In this process, the particles are dispersed in a liquid dispersant, for example an alcohol, and the dispersion is coated onto the metal substrate. The dispersion can have a weight ratio of solid particles to liquid of, for example, about 1:4. After coating, a vacuum is applied to the bottom of the substrate to pull the liquid dispersant through the metal substrate leaving a dispersed particle layer on the top surface of the metal substrate. The thus obtained sublayer of metal particles is dried to remove the liquid used for preparation of the suspension.

After drying, the substrate with the particles dispersed thereon is preferably pre-sintered to further adhere the particles to the substrate. According to one embodiment of the present invention, the sublayer and the metal substrate are rolled together in a rolling mill prior to pre-sintering. The pressure in the rolling mill should be sufficient to substantially adhere the particles to the metal substrate. Thus, it is preferred that the rolling pressure be from about 50 MPa to about 100 MPa, and the gap between the rolls of the rolling mill can be selected to provide such a rolling pressure. During the step of rolling the sublayer, the thickness of the substrate material is typically reduced, for example by about 10%.

The pre-sintering time and temperature should be sufficient to sinter the metal particles to the metal substrate without substantially affecting the porosity of the substrate. Preferably, the pre-sintering temperature is equal to from about 0.5 to about 0.7 of the melting temperature of the substrate metal. For example, the substrate can be pre-sintered at a temperature of from about 900° C. to about 1000° C. for about 30 minutes. Preferably, the sintering is done in a substantial vacuum (e.g. about $10^{-5}$ torr or less) to reduce the formation of undesirable oxides.

The formation of the sublayer of metal particles creates a foundation for the application of a filtering layer comprising ultra-fine ceramic particles. That is, the top layer (hereinafter referred to as the filtering layer) can now be applied to the substrate and sintered. As is discussed hereinabove, the sublayer is not necessary when the filtering layer consists essentially of metal particles. After sintering, the filtering layer is sintered onto the sublayer of particles on the metal substrate and onto the substrate. When the sublayer particles are applied to the substrate by means such as the vacuum bleeding process discussed hereinabove, the sublayer particles can partly penetrate into the pores of the substrate. This permits improved adhesion between the particles of the filtering layer and the substrate. Due to the fact that the sublayer is formed with disperse particles, the porosity of the sublayer is substantially higher than the porosity of the substrate and this high porosity sublayer compensates for the thermal stresses that can occur between the metal substrate and the ceramic filtering layer when the filter membrane is exposed to elevated temperatures. Therefore, thermal stresses will not substantially degrade the filtering layer of particles due to delamination.

The filtering layer of ultra-fine particles can be produced from a prepared suspension of the particles by methods similar to those described for the sublayer of particles. However, the increased thickness of the filtering layer of ultra-fine particles will typically require a more concentrated dispersion of particles. For example, the weight ratio of solids to liquid can be about 1:3. Preferably, the as-coated filtering layer of ultra-fine particles has a thickness of less than about 30 μm.

According to the present invention, the thus obtained multi-layer membrane is dried and then shear force is applied to the ultra-fine particles, preferably by passing the substrate through a rolling mill. The use of a rolling mill to apply the filtering layer onto the metal substrate is conducted at a pressure sufficient to ensure plastic deformation of the ultra-fine particles. Plastic deformation of the particles occurs due to the size effect of plasticity. For ultra-fine particles, the critical particle size is experimentally defined as one at which plastic deformation occurs at the shearing pressure of the rolling mill. For the particles used according to the present invention, the maximum particle size is about 500 nm and is preferably less than about 200 nm. Coarser particles do not substantially plastically deform at reasonably obtainable pressures and the coating can lose continuity since particles that do not deform may not sufficiently adhere to the metal substrate. During the shear deformation of the ultra-fine powder, "cold welding" of the ultra-fine particles to each other and to the sublayer occurs. Cold welding is initiated by the processes of dynamic recrystallization in the ultra-fine structures.

The rolling pressure that ensures the necessary plastic deformation for the ultra-fine ceramic particles with an average particle size below about 100 nm is in the range of from about 50 MPa to about 100 MPa. During the process of rolling under such pressures, the thickness of the substrate material is reduced, for example by about 5%. A substantially lower pressure will not ensure the creation of the desired homogeneity of the filtering layer, while exceeding about 100 MPa pressure may destroy the metallic substrate material. In one preferred embodiment, the thickness of the second layer is equal to about 100 times the average size of the ultra-fine particles after rolling.

The application of shear force by the rolling mill ensures the formation of a continuous thin layer from ultra-fine particles and pore size homogeneity following sintering. The rolling mill advantageously reduces the pore size distribution (the range of pore sizes) during the rolling step. It has been found that in the absence of such a rolling step a wide distribution of pore sizes in the sintered filter will result. A heterogeneous filter of this type is not useful for effective filtering operations. Further, pressing operations that do not impart the shear force of a rolling mill will not effectively narrow the pore size distribution.

The plastic deformation effect in ultra-fine particles is caused by dynamic re-crystallization at the shearing strain. As discussed above, when metallic particles are used for the filtering layer, a sublayer is not necessary since substantially no thermal stresses will form between the substrate and the filtering layer. When a ceramic compound is used for the filtering layer, ultra-fine metallic particles, for example with a mean particle size of about 50 nm, can advantageously be added to and mixed with the ultra-fine ceramic particles in a small quantity, for example up to about 1 weight percent. These ultra-fine metal particles can be carried in suspension with the ultra-fine ceramic particles to activate the process of inter-particle sliding of the ultra-fine ceramic particles during the rolling step.

The rolled multi-layer membrane is thereafter sintered for the formation of a cohesive filtering layer. The process of sintering is preferably carried out in a substantial vacuum to prevent oxidation reactions. The sintering temperature is preferably in the range of from about 0.3 to about 0.5 of the melting point of the ultra-fine particles. A temperature exceeding this upper limit may result in large grain growth and subsequent degradation of the ultra-fine structure of the filtering layer.

A thin porous metal substrate, preferably with a thickness of less than about 200 μm, is thus formed. The filtering layer preferably has a thickness of less than about 10 μm and with a microporous structure having an average pore size in the range of from about 30 nm to about 200 nm.

The use of a metallic substrate advantageously makes it possible to obtain filtering elements having large dimensions, for instance, in the form of tapes, sheets, or rolls. This permits both efficient production of the membranes and employment of the membranes in many applications.

EXAMPLE 1

A porous titanium metal substrate having a thickness of about 200 μm is provided and a dispersion of titanium metal powder having a mean particle size of about 10 μm is dispersed thereon. This sublayer of particles is then pre-sintered at 900° C. for about 30 minutes.

A suspension containing ultra-fine particles of titanium oxide with a mean size of about 40 nm and about 1 weight percent (based on the weight of titanium oxide) titanium metal powder with a mean particle size of about 50 nm, is deposited by sputtering onto the porous titanium metal substrate comprising the sublayer of titanium metal particles. The small addition of titanium powder assists in the initiation of the process of interparticle sliding during the rolling of the fine particles of $TiO_2$. The addition of the metal powder to the $TiO_2$ advantageously permits continuity in the $TiO_2$ layer under substantially lower rolling pressures. During the process, there is no substantial reduction in the porosity of the metal substrate.

The dried thin layer of titanium oxide is thus rolled on a rolling mill at a pressure of about 50 MPa. Drying is carried out for removal of the liquid suspension and final sintering occurs at a temperature of about 800° C. to 850° C.

As a result of these operations, a two-layer filtering material is obtained having a titanium-titanium oxide composition with mean pore diameter about 100 nm in a thin filtering layer.

EXAMPLE 2

A two-layer filter is produced comprising a porous titanium foil having a thickness about 200 μm, covered with a thin filtering layer of titanium nitride ultra-fine particles. The filtering layer has a thickness of about 5 μm to 7 μm and mean pore diameter of about 100 nm. The sublayer comprises a fine powder of titanium having an average particle size of about 10 micrometers. Stages of drying and rolling are analogous to Example 1. The sintering is carried out at a temperature of about 900° C.

EXAMPLE 3

A two-layer filter is produced including a porous substrate in the form of a thin stainless steel foil having a thickness of about 75 μm. A sublayer is formed on the substrate from a fine powder of stainless steel (316L type) having an average particle size of about 10 micrometers. A suspension containing titanium oxide and aluminum oxide powder having an average particle size of about 30 nm, in a mass ratio of 1:3, is deposited on the substrate by means of sputtering. Stages of drying and rolling are analogous to Example 1. Sintering of the material is at a temperature of about 1000° C.

The resulting membrane filter comprises the stainless steel substrate covered with a thin filtering layer having a thickness of from about 5 μm to about 7 μm. The filtering layer is formed from an ultra-fine powder mixture of titanium oxide and aluminum oxide and the filtering layer has a mean pore diameter of about 30 nm.

EXAMPLE 4

A substrate made from a porous stainless steel (type 316L) foil with a thickness of about 150 micrometers is provided. A sublayer is applied comprising a fine powder of stainless steel (type 316L) with an average particle size of about 10 microns. An ultra-fine powder of titanium carbide with an average particle size of about 60 nanometers is applied to the substrate by means of forced vacuum bleeding of a powder suspension through the substrate covered by the sublayer of fine 316L powder. Stages of drying and rolling are similar to those described for Example 1 hereinabove. Sintering of the material is carried out at a temperature of about 950° C.

The resulting membrane filter includes a thin filtering layer consisting of ultra-fine titanium carbonitride powder with a thickness of from about 7 μm to about 10 μm and a mean pore size of about 100 nanometers.

EXAMPLE 5

A porous titanium foil substrate with a thickness of about 200 micrometers is provided. A sublayer of fine powder is applied consisting of titanium metal powder having an average particle size of about 10 micrometers. A suspension of ultra-fine powder of titanium diboride and titanium nitride with an average particle size of about 50 nanometers and a weight ratio of solids to liquid of about 1:4 is applied by means of forced vacuum bleeding of the powder suspension through the porous substrate. Stages of drying and of preliminary rolling are similar to those described in Example 1. Sintering of the material is carried out at a temperature of about 900° C.

The thus formed thin filtering layer consists of a mixture of ultra-fine titanium nitride and titanium diboride and has a thickness of from about 7 μm to about 10 μm and a mean pore size of about 70 nanometers.

Membranes produced according to the present invention provide a number of advantages. The hydraulic and gas-dynamic characteristics are improved due to the decrease in thickness of the membranes. Further, these membranes will last a significantly long time before regeneration is necessary. The membranes can be regenerated by means of reverse flow, etching or heat treatment at temperatures up to about 400° C. The membranes may be useful in a temperatures, for example, up to about 400° C. The strength of the membrane permits the use of these membranes at pressures up to 0.6 MPa. Further, the filters are ductile and can be bent, welded or cut.

The membranes are particularly useful for filtration of waste-water, concentrating suspensions of microorganisms and separation of organic solutions, clarifying wines and juices, and filtration of inert and transport gases.

While various embodiments of the present invention have been described in some detail, it is apparent that modifications and adaptations of those embodiments will occur to those skilled in the art. However, it is to be expressly understood that such modifications and adaptations are within the spirit and scope of the present invention.

What is claimed is:

1. A process for the fabrication of a composite membrane, comprising the steps of:
   (a) dispersing metallic particles having a particle size of less than about 50 μm on a porous metallic substrate to form a sublayer;
   (b) pre-sintering said sublayer to adhere said sublayer to said metallic substrate;
   (c) covering at least a portion of said sublayer with ultra-fine ceramic particles having an average particle size of less than about 500 nm;

(d) applying shear force to said ultra-fine particles to plastically deform said particles; and (e) sintering said ultra-fine particles to form a composite membrane comprising a filtering layer and a metallic substrate.

2. A process as recited in claim 1, wherein said metallic particles are dispersed on said metallic substrate such that substantially no metallic particles are in contact with adjacent metallic particles.

3. A process as recited in claim 1, wherein said step of applying shear force comprises the step of passing said ultra-fine particles on said metallic substrate through a roller mill.

4. A process as recited in claim 3, wherein said roller mill applies a pressure of from about 50 MPa to about 100 MPa.

5. A process as recited in claim 1, wherein said metallic substrate has a thickness of less than about 250 μm.

6. A process as recited in claim 1, wherein said metallic substrate has a thickness of from about 30 μm to about 200 μm.

7. A process as recited in claim 1, wherein said metallic substrate has an average pore size of less than about 30 μm.

8. A process as recited in claim 1, wherein said metallic substrate has an average pore size of from about 2 μm to about 15 μm.

9. A process as recited in claim 1, wherein said metallic substrate has a total porosity of from about 30 percent to about 45 percent.

10. A process as recited in claim 1, wherein said metallic substrate is comprises a metal selected from the group consisting of titanium, nickel, silver and alloys thereof.

11. A process as recited in claim 1, wherein said metallic substrate comprises stainless steel.

12. A process as recited in claim 1, wherein said metallic particles have an average particle size of from about 5 μm to about 20 μm.

13. A process as recited in claim 1, wherein said metallic particles consist essentially of the same metallic material as said metallic substrate.

14. A process as recited in claim 1, wherein said ultra-fine ceramic particles comprise ceramic selected from the group consisting of oxides, nitrides, carbides, borides, their solid solutions and mixtures thereof.

15. A process as recited in claim 1, wherein said ultra-fine ceramic particles consist essentially of material selected from the group consisting of titanium oxide, titanium nitride, titanium diboride, titanium carbide, aluminum oxide and mixtures thereof.

16. A process as recited in claim 1, wherein said ultra-fine ceramic particles have an average particle size of less than about 200 nm.

17. A process as recited in claim 1, wherein said ultra-fine ceramic particles have an average particle size of from about 10 nm to about 100 nm.

18. A process as recited in claim 1, wherein said ultra-fine ceramic particles are mixed with ultra-fine metallic particles.

19. A process as recited in claim 18, wherein up to about 1 weight percent of said ultra-fine metallic particles are mixed with said ultra-fine ceramic particles.

20. A process as recited in claim 1, wherein said ultra-fine particles on said metallic substrate have a thickness of less than about 30 μm before said step of applying pressure.

21. A process as recited in claim 1, wherein said filtering layer has an average pore size of from about 30 nanometers to about 200 nanometers.

22. A process as recited in claim 1, wherein said sintering step comprises the step of heating to a temperature of from about 0.3 to about 0.5 of the melting temperature of said ultra-fine ceramic particles.

23. A process as recited in claim 1, wherein said metallic substrate comprises titanium and said ultra-fine ceramic particles comprise titanium dioxide.

24. A process as recited in claim 1, wherein said metal substrate comprises stainless steel and said ultra-fine ceramic particles comprise titanium dioxide.

25. A process as recited in claim 1, wherein said step of covering at least a portion of said substrate with ultra-fine particles comprises the step of forced vacuum bleeding of a particle suspension through said substrate.

26. A process for the fabrication of a composite membrane, comprising the steps of:

(a) dispersing ultra-fine particles on a metallic substrate;

(b) applying shear force to said ultra-fine particles having an average size of less than about 500 nm, to plastically deform said particles; and (c) sintering said ultra-fine particles to form a composite membrane.

27. A process as recited in claim 26, wherein said ultra-fine particles have an average particle size of less than about 200 nm.

28. A process as recited in claim 26, wherein said ultra-fine particles consist essentially of metal particles.

29. A process as recited in claim 28, wherein said ultra-fine metal particles are formed from the same metal as said metallic substrate.

30. A process as recited in claim 26, wherein said ultra-fine particles comprise ceramic particles having an average size of less than about 200 nm.

31. A process as recited in claim 26, wherein said step if applying shear force comprises the step of rolling said ultra-fine particles on said substrate in a rolling mill.

32. A process for the fabrication of a composite membrane, comprising the steps of:

(a) providing a porous metallic substrate having thickness of less than about 250 μm an average pore size of less than about 30 μm and a total porosity of from about 30 percent to about 45 percent;

(b) dispersing metallic particles having an average particle size of less than about 50 μm on said metallic substrate to form a sublayer on said metallic substrate wherein substantially no metallic particles are in contact with adjacent metallic particles;

(c) pre-sintering said substrate having said sublayer dispersed thereon at a temperature of from about 0.5 to about 0.7 of the melting temperature of the metallic substrate;

(d) covering at least a portion of said metallic substrate having said sublayer thereon with ultra-fine ceramic particles having an average particle size of less than about 200 nm;

(e) applying shear force to said ultra-fine particles on said substrate by passing said substrate through a rolling mill to plastically deform said particles; and (f) sintering said ultra-fine particles to form a composite membrane.

33. A filter element, comprising:

(a) a top layer comprising sintered ultra-fine ceramic particles and having an average pore size of from about 30 nanometers to about 200 nanometers;

(b) a middle layer comprising sintered metallic particles having an average particle size of from about 5 μm to about 20 μm; and (c) a bottom layer comprising a porous metallic substrate;

wherein said middle layer has a higher total porosity than said top layer and said bottom layer such that thermal stresses between said top layer and said bottom layer are reduced.

34. A filter element as recited in claim 33, wherein said filter element has a thickness of less than about 250 μm.

35. A filter element as recited in claim 33, wherein said filter element has sufficient strength to withstand a pressure drop of up to about 0.6 MPa without substantially degrading.

36. A filter element as recited in claim 33, wherein said sintered metallic particles and said metallic substrate consist essentially of the same metallic material.

37. A filter element as recited in claim 33, wherein said bottom layer comprises a titanium metal substrate and said top layer comprises sintered ultra-fine particles of titanium dioxide.

38. A filter element as recited in claim 33, wherein said bottom metallic substrate comprises titanium and said ceramic comprises titanium nitride.

39. A filter element as recited in claim 33, wherein said metallic substrate comprises stainless steel and said ceramic comprises titanium dioxide.

* * * * *